United States Patent [19]
Gagnon

[11] Patent Number: 5,713,707
[45] Date of Patent: Feb. 3, 1998

[54] U-NUT AND STAND-OFF FASTENER

[75] Inventor: Michael G. Gagnon, Oakville, Conn.

[73] Assignee: Illinois Tool Works, Inc., Glenview, Ill.

[21] Appl. No.: 782,459

[22] Filed: Jan. 10, 1997

Related U.S. Application Data

[63] Continuation of Ser. No. 451,189, May 26, 1995, abandoned.

[51] Int. Cl.[6] .......................... F16B 37/02; F16B 39/284
[52] U.S. Cl. ..................... 411/175; 411/174; 411/112; 411/524
[58] Field of Search .................... 411/112, 174, 411/175, 522, 523, 524

[56] References Cited

U.S. PATENT DOCUMENTS

| | | | |
|---|---|---|---|
| 3,123,880 | 3/1964 | Barry et al. | 411/175 |
| 3,145,753 | 8/1964 | Kreider | 411/112 |
| 3,229,743 | 1/1966 | Derby | 151/41.75 |
| 3,426,818 | 2/1969 | Derby | 151/41.75 |
| 4,243,086 | 1/1981 | Kuttler et al. | 411/174 |
| 4,643,610 | 2/1987 | Bien | 403/407 |
| 4,684,305 | 8/1987 | Dubost | 411/174 |
| 4,714,392 | 12/1987 | Muller et al. | 411/175 |
| 4,729,706 | 3/1988 | Peterson et al. | 411/175 |
| 4,826,375 | 5/1989 | Holton | 411/174 |
| 4,883,397 | 11/1989 | Dubost | 411/174 |
| 4,897,005 | 1/1990 | Peterson et al. | 411/175 |
| 5,026,235 | 6/1991 | Muller et al. | 411/523 |

Primary Examiner—Rodney M. Lindsey
Assistant Examiner—Robert G. Santos
Attorney, Agent, or Firm—St. Onge Steward Johnston & Reens

[57] ABSTRACT

An improved U-nut with the ability to be frictionally mounted to a panel by the frictional engagement of first and third legs with the panel. The third leg is resiliently connected to a second leg that is in turn connected to the first leg. A threaded barrel on the third leg receives a fastener to connect two panels together.

9 Claims, 2 Drawing Sheets

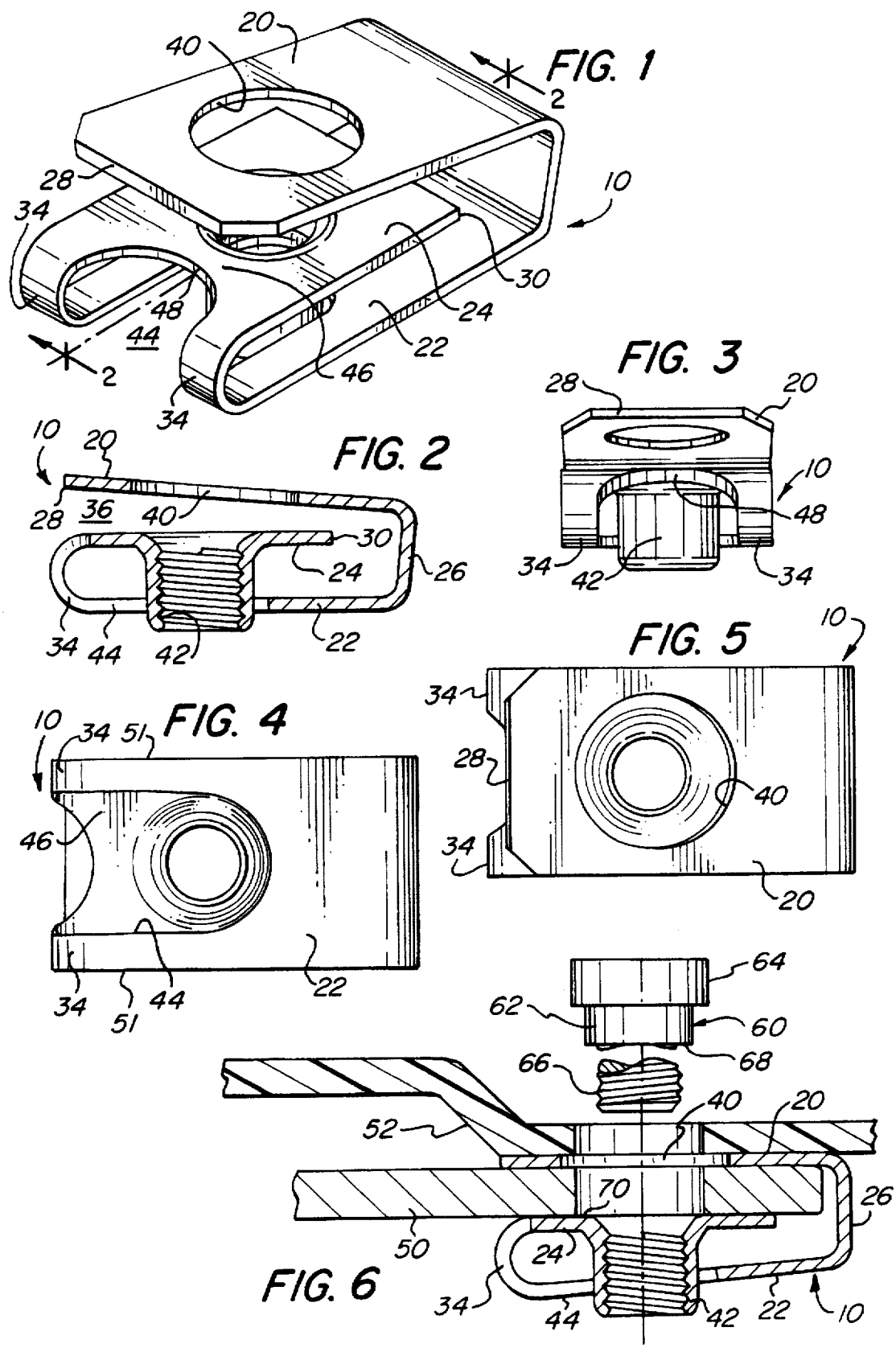

U-NUT AND STAND-OFF FASTENER

This application is a continuation of U.S. application Ser. No. 08/451,189 filed May 26, 1995 now abandoned entitled "Improved U-Nut".

FIELD OF THE INVENTION

The present invention relates to an improved U-nut which will frictionally mount and be retained on a panel, and which is used in securing an object such as another panel to the first panel.

DESCRIPTION OF THE PRIOR ART

A U-nut currently used in the automotive industry for securing together panels comprising a U-nut having two joined legs between which one of the panels is disposed. Typically, one leg has an aperture, and the second leg has integrally formed thereon a threaded barrel which serves as a nut. A semi-circular tongue extends from the one leg toward the second leg, and frictionally engages the sheet material. The tongue intersects a zone between the barrel and aperture on the two legs. The semi-circular tongue has a circular hole such that a threaded bolt can be passed through the tongue to insert into the threaded barrel of the second leg. This known U-nut is described in U.S. Pat. No. 3,426,818 to Derby for a Yielding Nut Retainer. Another such U-nut or J-nut is described in U.S. Pat. No. 3,229,743 to Derby for a Sheet Metal Nut with Yielding Retainer.

Several improvements to this conventional U-nut have been proposed to address these problems, for example, the U-nuts disclosed in Peterson, U.S. Pat. No. 4,729,706 and in U.S. Pat. No. 4,897,005.

None of the known U-nuts are usable where a stand-off screw is to be used in combination with the U-nut. Such a stand-off screw is desirable when the U-nut is used with a plastic panel that might fracture if force were applied to the panel. The tongue of prior art U-nuts interferes with the stand-off portion of the screw. In such case, the tongue must be omitted, and consequently the U-nut lacks the ability to be frictionally mounted to the panel prior to fastening with a screw.

SUMMARY OF THE INVENTION

It is an object of the invention to provide an improved U-nut that avoids the problems of the prior art, and which is adapted for use with a stand-off fastener, yet has the desirable features of a U-nut, including ability to frictionally mount to a panel, preferably with a low push-on force. It is an object of the invention that such a U-nut be adapted to mounting to panels of a range of thicknesses without substantial variance in the effectiveness of the U-nut. It is an object of the invention to provide such a U-nut that lacks sharp protrusions that could damage the panel.

A U-nut in accordance with one embodiment of the invention comprises first and second spaced apart legs, which are joined together and which have axially aligned apertures therein, with a third leg located between and spaced apart from the first and second legs. The third leg is resiliently joined to the second leg and has a fastening means, such as a threaded barrel, which is axially aligned with the leg apertures and extends towards the second leg and into the second leg aperture.

The third leg is resiliently joined to the second leg by two narrow, curved, strips that permit the third leg to flex towards the second leg when the U-nut is mounted on a panel to provide a low push-on force and yet can frictionally maintain the U-nut on the panel. The U-nut is mounted to a panel by locating an edge of a panel between the first and third legs at the open end of the U-nut and pushing the U-nut onto the panel.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 1 is a perspective view of an embodiment of an improved U-nut in accordance with the invention.

FIG. 2 is a cross-sectional view along the line 2—2 of the embodiment of the U-nut of FIG. 1.

FIG. 3 is a front elevation view of the embodiment of the U-nut of FIG. 1.

FIG. 4 is a bottom plan view of the embodiment of the U-nut of FIG. 1.

FIG. 5 is a top plan view of the embodiment of the U-nut of FIG. 1.

FIG. 6 is a cross-sectional view of a U-nut of FIG. 1 showing the U-nut mounted to a panel and the use of a fastener to secure the panels together.

DETAILED DESCRIPTION OF THE PREFERRED EMBODIMENT

Figure 7:
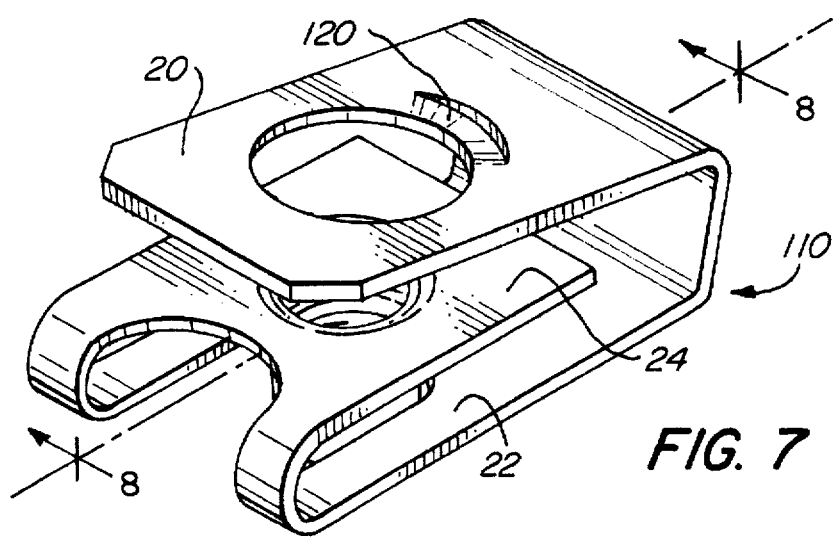
FIG. 7 is a perspective view of a second embodiment of an improved U-nut in accordance with the invention.
Figure 8:
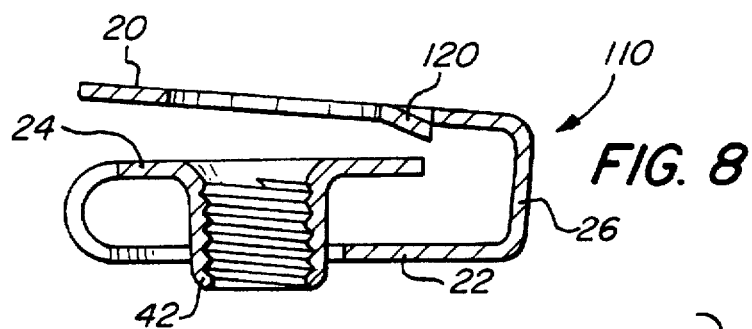
FIG. 8 is a top plan view of the embodiment of the U-nut of FIG. 7.
Figure 9:
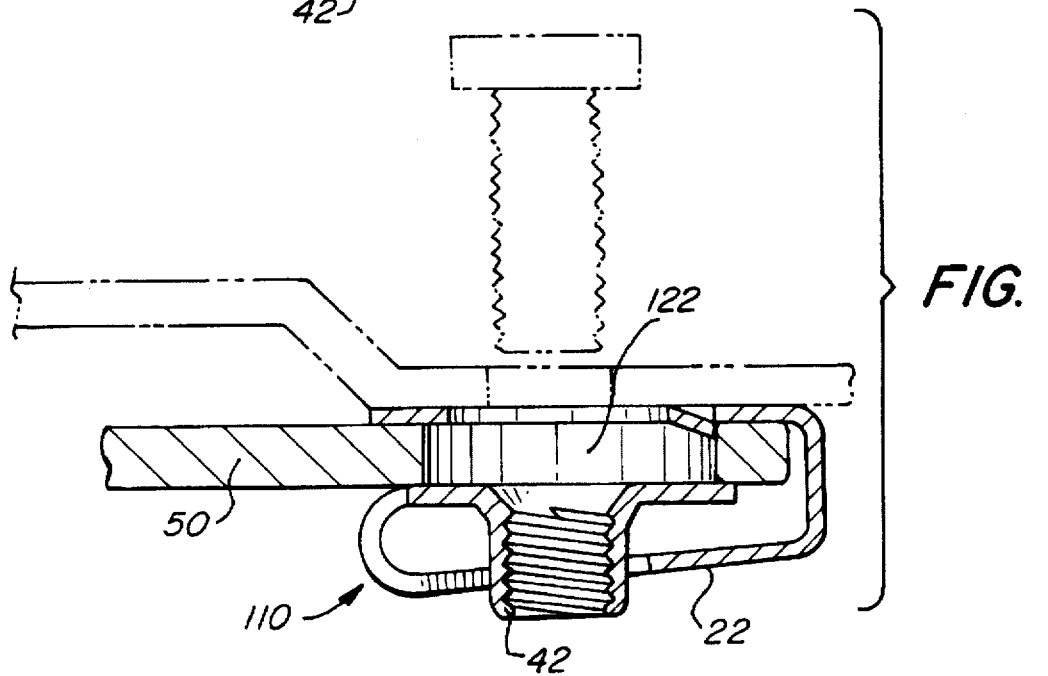
FIG. 9 is a cross-sectional view of a U-nut of FIG. 7 showing the U-nut mounted to a panel and the use of a fastener to secure the panels together.

Referring now to FIGS. 1–9, where like numerals indicate like elements in the drawings, an improved U-nut 10 in accordance with one embodiment of the invention is shown in FIGS. 1–6, and a second embodiment, shown as U-nut 110, is shown in FIGS. 7–9. U-nut 10, 110 is formed from a metal sheet such as steel. U-nut 10, 110 comprises a first leg 20, a second leg 22, and a third leg 24. First leg 20 is spaced apart from second leg 22 and they are joined together by a bridge 26. Bridge 26 is preferably located at the rear of the U-nut 10, 110 as shown in FIGS. 1 and 2, but may be located elsewhere, depending on the shape of the panel on which the U-nut 10, 110 is to be mounted.

Third leg 24 is located between and spaced apart from both the first leg 20 and the second leg 22. Thus the three legs 20, 22, and 24 are roughly parallel to each other, though as can be seen in FIG. 2, preferably the front edge 28 of first leg 20 is slightly upwardly angled relative to the plane of second leg 22, and the rear edge 30 of third leg 24 is slightly upwardly angled relative to the plane of second leg 22.

Third leg 24 is resiliently joined to the second leg 22, to provide a resilient element to provide frictional mounting of the U-nut 10, 110 to a panel. Third leg 24 is preferably resiliently joined to second leg 22 by at least one, and preferably two, narrow, curved, strips 34 that permit the third leg 24 to flex towards the second leg 22 when the U-nut 10, 110 is mounted on a panel. Strips 34 preferably define a 180 degree arc to connect legs 22 and 24. As can be seen in FIGS. 6 and 9, U-nut 10, 110 is mounted to a panel by locating an edge of a panel 50 between the first and third legs 20 and 24 at the open end 36 of the U-nut 10, 110. The U-nut 10, 110 is then pushed onto the panel. It is desirable to have a minimum push-on force to reduce worker injuries that can arise from repetitive motions, and the present invention provides such a desirable low push-on force. However, the U-nut is also retained on the panel so that it will remain in place for subsequent securing together with a threaded fastener.

First leg 20 has an aperture 40 therein. Third leg 24 has a fastening means, preferably an integrally formed, internally threaded barrel 42 for receiving a threaded fastener, which is axially aligned with aperture 40, and which extends toward second leg 22. Second leg 22 has an aperture 44 which is also axially aligned with aperture 40 and barrel 42, to provide clearance for the threaded barrel 42 and the fastener 60 that is fitted into barrel 42. Aperture 44 is preferably an elongated, longitudinally extending or oval aperture that is defined by a semicircular lip 48 on the lower leg 22 and by the two narrow strips 34. In such case, the two narrow strips 34 extend along outer edges 51 of the U-nut 10 from the second leg 22 adjacent the second leg aperture 44 to a zone 46 adjacent the threaded barrel 42. The second leg aperture 44 therefore preferably comprises a longitudinal aperture extending from the second leg 22 to the zone 46 adjacent the threaded barrel 42. Preferably the end of aperture 44 adjacent zone 46 is curved or semicircular.

Preferably, first leg 20, the second leg 22, and third leg 24 comprise generally planar bodies, whereby U-nut 10 comprises a series of flat elements with the features as discussed herein. The legs 20 and 24 are separated to receive panel 50 therebetween, as shown in FIGS. 6 and 9.

Referring now to FIGS. 7–9, the U-nut 110 is shown. U-nut 110 is, as described above, the same as U-nut 10, but has an additional retainer 120 formed in the first leg 20 by piercing or lancing the first leg 120. Retainer 120 is a small curved element that extends towards the third leg 24. Retainer 120 serves to hold U-nut 110 in place and in register with aperture 122 in panel 50 when the U-nut 110 is mounted to the panel.

A stand-off fastener 60 having a larger diameter section 62 adjacent a head 64 and a smaller diameter section 66 adjacent the larger diameter section 62 can be used with U-nut 10. The smaller diameter section 66 is threaded to mate with the threaded barrel 42. A shoulder 68 is located between the larger and smaller diameter sections 62 and 66. Shoulder 68 abuts and is received by the inner face 70 of the third leg 24 when the fastener 60 is secured together with the threaded barrel 42 of the U-nut 10. The shoulder 68 of the stand-off fastener 60 seats against the inner face 70 and thus limits the gap between the legs 20 and 24 to a selected gap width. The selected gap width will be determined by the length of larger diameter section 62 or shank of the fastener 60. The consistent gap width prevents excess compression on the panels 50 and 52 to prevent distortion, warping and fracturing that can occur when the panels 50 and 52 are plastic panels that are susceptible to damage when subject to large compressive loads.

As seen in FIGS. 6 and 9, the U-nut 10 can thus be used in combination with fastener 60 to secure panel 50 to another object such as another panel 52 or a framework.

The present invention therefore provides a U-nut with a desirable low push-on force and the ability to be frictionally mounted to a panel. The U-nut also permits the use of a stand-off fastener with the U-nut to avoid excess compressive force on a panel onto which the U-nut is mounted.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. The combination of a U-nut and a stand-off fastener, comprising:
   a U-nut, having
     a first leg having a first leg aperture therein,
     a second leg spaced apart from said first leg and having a second leg aperture therein, said aperture being axially aligned with said first leg aperture,
     a bridge joining said first and second legs,
     a third leg located between and spaced apart from said first and second legs, said third leg having an internally threaded barrel provided therein, said internally threaded barrel being axially aligned with said first leg aperture and said second leg aperture and extending from said third leg towards said second leg aperture, and
     a pair of narrow strips extending from said second leg to said third leg to resiliently join said second leg to said third leg whereby said U-nut may be mounted and frictionally retained to a panel by locating said panel between said first and third legs; and
   a stand-off fastener having
     a head,
     a larger diameter section adjacent said head of said stand-off fastener,
     a smaller diameter section adjacent said larger diameter section of said stand-off fastener, said smaller diameter section being threaded to be secured together with said threaded barrel,
     a shoulder located between said larger and smaller diameter sections of said stand-off fastener said shoulder abutting against an inner face of said third leg when said smaller diameter section of said stand-off fastener is secured together with said threaded barrel;
   whereby a gap between said first leg and said third leg is limited to a selected gap width corresponding to a length of said larger diameter section, thereby preventing excess compression, caused by securing together of said smaller diameter section of said stand-off fastener with said threaded barrel, of workpieces to be secured together by said combination of U-nut and stand-off fastener.

2. The combination of claim 1 wherein said narrow strips have a resilience such that said U-nut may be mounted to a panel with a low push-on mounting force by placing said U-nut such that said first and second legs straddle a panel edge.

3. The combination of claim 1, further comprising a lanced retainer formed in said first leg and extending toward said third leg.

4. The combination of claim 1, wherein said narrow strips extend from said second leg adjacent said second leg aperture to a zone adjacent said threaded barrel whereby said second leg aperture comprises a longitudinal aperture extending from said second leg to said zone adjacent said threaded barrel.

5. The combination of claim 4 wherein said narrow strips have a resilience such that said U-nut may be mounted to a panel with a low push-on mounting force by placing said U-nut such that said first and second legs straddle a panel edge.

6. The combination of claim 5, further comprising a lanced retainer formed in said first leg and extending toward said third leg.

7. The combination of a U-nut and a stand-off fastener, comprising:

a U-nut, having
- a first leg having a first leg aperture therein,
- a second leg spaced apart from said first leg and having a second leg aperture therein, said aperture being axially aligned with said first leg aperture,
- a bridge joining said first and second legs,
- a third leg located between and spaced apart from said first and second legs, said third leg having an internally threaded barrel provided therein, said internally threaded barrel being axially aligned with said first leg aperture and said second leg aperture and extending from said third leg towards said second leg aperture, and
- resilient means extending from said second leg to said third leg to resiliently join said second leg to said third leg whereby said U-nut may be mounted and frictionally retained to a panel by locating said panel between said first and third legs; and a stand-off fastener having
- a head,
- a larger diameter section adjacent said head of said stand-off fastener,
- a smaller diameter section adjacent said larger diameter section of said stand-off fastener, said smaller diameter section being threaded to be secured together with said threaded barrel,
- a shoulder located between said larger and smaller diameter sections of said stand-off fastener said shoulder abutting against an inner face of said third leg when said smaller diameter section of said stand-off fastener is secured together with said threaded barrel;

whereby a gap between said first leg and said third leg is limited to a selected gap width corresponding to a length of said larger diameter section, thereby preventing excess compression, caused by securing together of said smaller diameter section of said stand-off fastener with said threaded barrel, of workpieces to be secured together by said combination of U-nut and stand-off fastener.

8. The combination of claim 7, wherein said resilient means comprise a pair of narrow metal strips.

9. The combination of claim 7, further comprising a lanced retainer formed in said first leg and extending toward said third leg.

* * * * *